April 7, 1953     L. D. THOSTENSON     2,633,956
CENTRIFUGAL AND SPRING ENGAGED CLUTCH
Filed Aug. 25, 1950     2 SHEETS—SHEET 1
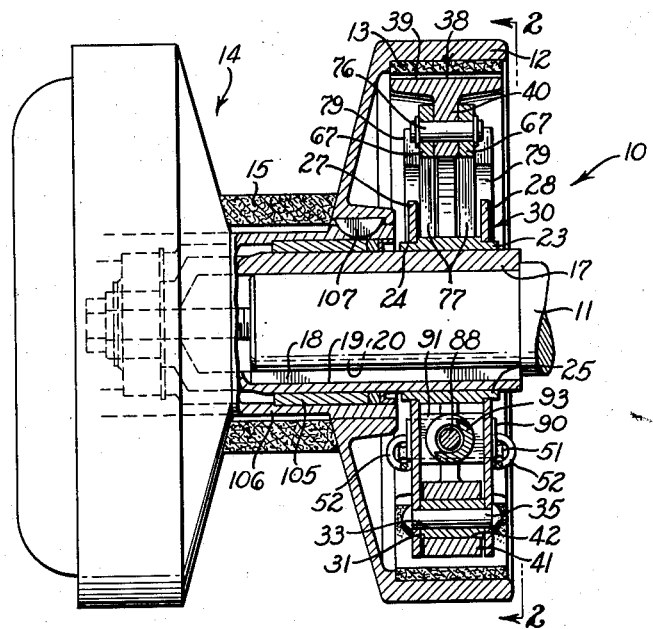
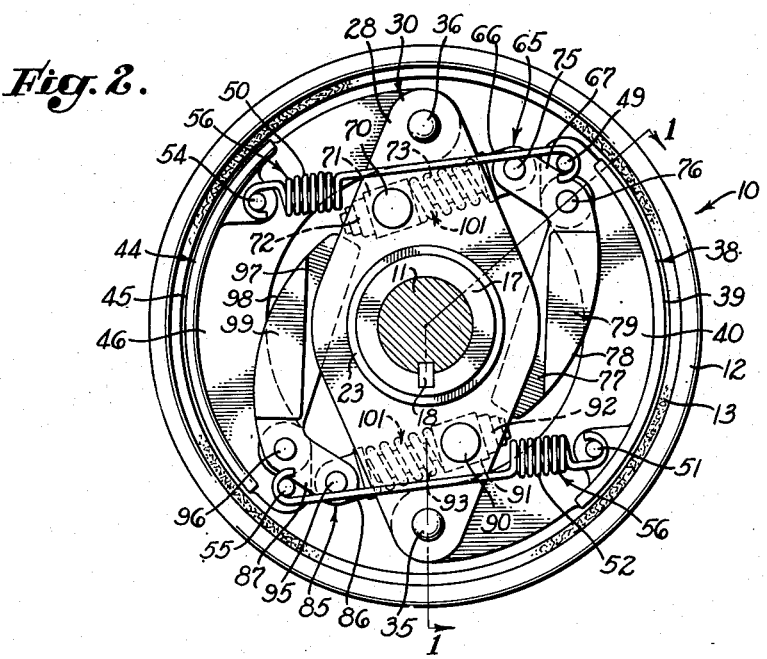
INVENTOR.
LEWIS D. THOSTENSON
BY HIS ATTORNEYS.
HARRIS, KIECH, FOSTER & HARRIS

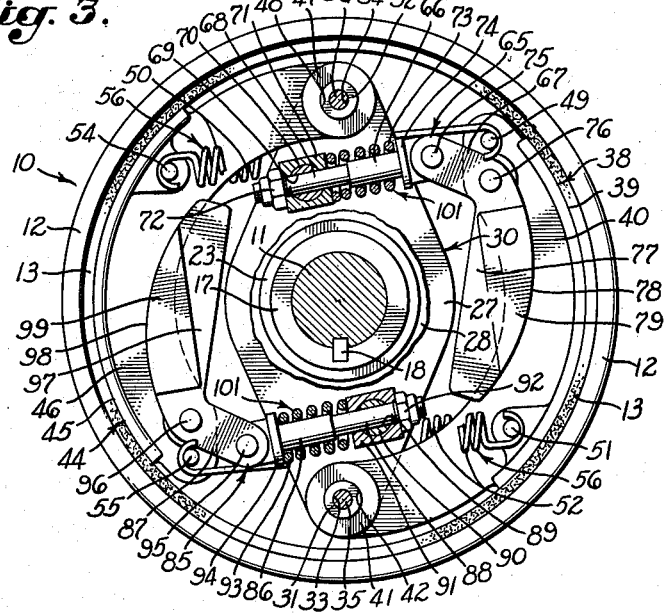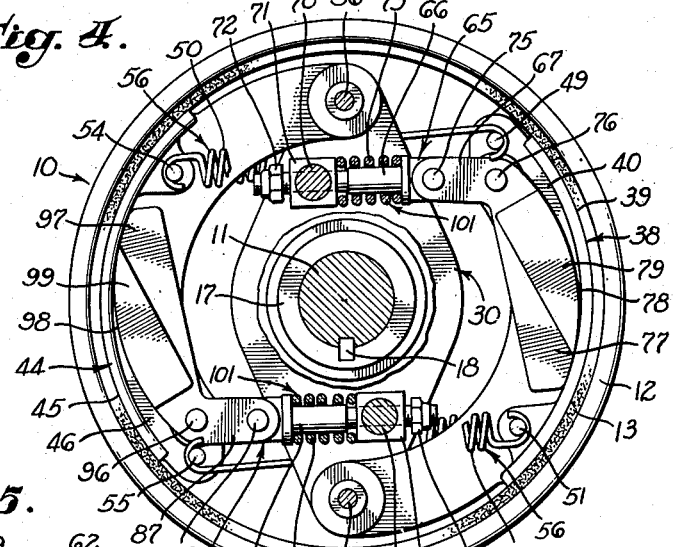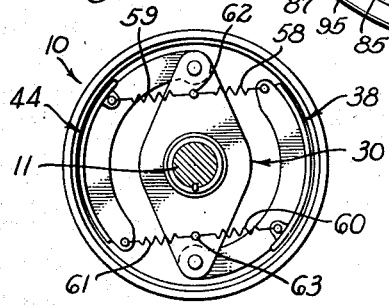

Patented Apr. 7, 1953

2,633,956

UNITED STATES PATENT OFFICE 2,633,956

CENTRIFUGAL AND SPRING ENGAGED CLUTCH

Lewis D. Thostenson, Inglewood, Calif., assignor to Salsbury Corporation, Los Angeles, Calif., a corporation of California Application August 25, 1950, Serial No. 181,386

1 Claim. (Cl. 192—105)

This invention relates to centrifugal clutches and, more particularly, to a centrifugal clutch of the type which includes a drive shaft, a driven drum and centrifugally actuable clutch shoes adapted to engage said driven drum to transmit torque from said drive shaft to said driven drum.

A wide variety of centrifugal clutches is to be found on the market at the present time, some of these clutches including centrifugally actuable shoes or the equivalent which are adapted to be centrifugally urged by a drive shaft into contact with a driven drum to establish an operative relationship between said drive shaft and said driven drum. One of the major disadvantages of conventional centrifugal clutches is that, as the torque transmitted from the drive shaft to the driven drum through the centrifugally actuable shoes increases, slippage and resultant loss of power and overheating of the driven drum ensue.

It is, therefore, a primary object of my invention to provide a centrifugal clutch of the aforementioned type in which the clutch shoes are initially urged into contact with the driven drum by centrifugal force alone but subsequently have applied thereto an auxiliary force of sufficient magnitude to maintain the shoes in operative and non-slipping engagement with the interior of the driven drum despite a relatively large increase in the torque transmitted through the shoes from the drive shaft to the driven drum.

Another object of my invention is the provision of a centrifugal clutch of the aforementioned type, the centrifugally actuable shoes of which are restrained from movement toward the driven drum by primary spring means, it being necessary to overcome the tension of said primary spring means before said shoes can contact said drum, and which has auxiliary spring means adapted to supplement the centrifugal force in urging said shoes into engagement with said drum subsequent to the initial engagement of said shoes with said drum.

A further object of my invention is the provision of a centrifugal clutch of the aforementioned type in which the primary spring means is constituted by a plurality of tension springs for restraining the shoes of the clutch from engagement with the driven drum and the auxiliary spring means is constituted by a plurality of compression springs for urging said shoes into more intimate engagement with said drum subsequently to the initial engagement of said shoes with said drum.

An additional object of my invention is the provision of a centrifugal clutch of the aforementioned type in which the action of the auxiliary spring means in urging the shoes into more intimate engagement with the driven drum is delayed until the drive shaft has reached a predetermined speed so that the shoes will not be urged into more intimate engagement with the driven drum until this speed has been reached.

Another object of my invention is the provision of a centrifugal clutch of the aforementioned type in which the actuation of the auxiliary spring means is controlled by means of centrifugally actuable weights connected to said shoes.

A further object of my invention is the provision of a centrifugal clutch of the aforementioned type in which the shoes are connected to the drive shaft by means of linkages and said linkages have operatively associated therewith the aforesaid auxiliary spring means, the movement of said linkages being adapted to bring the auxiliary spring means into play to urge said shoes against the driven drum.

Another object of my invention is the provision of a centrifugal clutch of the aforementioned type in which the linkages connecting the shoes with the drive shaft are toggle linkages and have the auxiliary spring means mounted thereupon in such a manner that the spring means will, when the toggle linkages approach the over center point, cause the shoes to enter into more intimate engagement with the driven drum.

A further object of my invention is the provision of a centrifugal clutch which can be easily and economically manufactured and can be readily and expeditiously disassembled and assembled for maintenance and repair.

Other objects and advantages of my invention will be apparent from the following specification and the accompanying drawings, which are for the purpose of illustration only, and in which:

Fig. 1 is a partly sectional view taken on the broken line 1—1 of Fig. 2 of a clutch constructed in accordance with my invention;

Fig. 2 is a front elevational view taken on the broken line 2—2 of Fig. 1;

Fig. 3 is a front elevational view showing the shoes of the clutch in initial engagement with the interior of the driven drum;

Fig. 4 is a front elevational view showing the manner in which the auxiliary spring means urges the shoes into more intimate engagement with the driven drum; and Fig. 5 is a front elevational view showing an alternative construction of my invention.

Referring to the drawings, and particularly to Figs. 1 and 2 thereof, I show a clutch 10 constructed in accordance with my invention and adapted to be utilized to transmit power or torque from a drive shaft 11 to a driven drum 12, the driven drum 12 being provided on its interior with a lining 13 formed of brake fabric or similar material. The clutch 10 and, more particularly, the driven drum 12 thereof constitutes a portion of a transmission 14 which is adapted to control the speed of operation of a drive wheel, not shown, through a driving belt 15. Since the elements at the left of the transmission structure, Fig. 1, do not constitute any part of the present invention, they will not be described herein.

Mounted upon the drive shaft 11 is a sleeve 17 which is prevented from rotating relative thereto by means of a key 18 disposed in a keyway 19 in the sleeve 17 and a keyway 20 in the shaft 11. Supported upon one end of the sleeve 17 is an annular collar 23 having annular shoulders 24 and 25 formed on opposite ends thereof adapted to receive, respectively, mounting plates 27 and 28 of substantially diamond-shaped configuration, said plates constituting a mount 30. The plates 27 and 28 may be pressed, welded, or otherwise affixed to the shoulders 24 and 25. Inserted between the opposite ends of the mounting plates 27 and 28 are bushings 31 and 32 adapted to space the mounting plates 27 and 28 from each other, said bushings having, respectively, longitudinal bores 33 and 34 adapted to receive rivets 35 and 36 which hold the mounting plates 27 and 28 and the bushings 31 and 32 in operative relationship with one another.

A clutch shoe 38 having an arcuate engaging face 39 and a centrally located arcuate mounting rib 40 is pivotally mounted upon the bushing 31 by means of a boss 41 formed at one end of the rib 40 and having a longitudinal bore 42 adapted to receive the bushing 31 to constitute a pivotal mounting for one end of the shoe 38. A clutch shoe 44 is disposed oppositely to and adapted to cooperate with the previously described clutch shoe 38. The clutch shoe 44 has an arcuate engaging face 45 formed thereupon and is provided with a centrally located mounting rib 46, said rib having formed upon one end thereof a mounting boss 47 having a longitudinal bore 48 adapted to receive the bushing 32 to accomplish the pivotal mounting of one end of the shoe 44 between the mounting plates 27 and 38 constituting the mount 30 of the clutch.

Provided upon one end of the centrally located rib 40 of the shoe 38 is a spring engaging pin 49 which projects from opposite sides of the rib 40 and is adapted to engage the ends of tension springs 50, it being understood that two tension springs 50 are provided, one on one side of the mount 30 and one on the other side of the mount 30, so that both ends of the pin 49 engage the end of a tension spring 50. A similar spring engaging pin 51 is provided at the opposite end of the clutch shoe 38, said pin being adapted to receive the ends of tension springs 52 disposed on opposite sides of the mount 30.

A spring engaging pin 54 is provided adjacent one end of the clutch shoe 44 and is adapted to engage the opposite ends of the tension springs 50, while another spring engaging pin 55 is provided at the opposite end of the clutch shoe 44 and is adapted to engage the other ends of the tension springs 52. The tension springs 50 and 52 constitute primary spring means 56 and are adapted to resist the outward movement of the clutch shoes 38 and 44 as the clutch shoes are subjected to centrifugal force by the rotation of the mount 30 upon which they are pivotally suspended. However, when the drive shaft 11 reaches a predetermined speed, let us say, 1000 R. P. M., the tension of the primary spring means 56 is overcome and the clutch shoes 38 and 44 move into engagement with the brake lining 13 on the interior of the driven drum 12 to establish a driving relationship between the drive shaft 11 and said driven drum.

Although the primary spring means 56 is presumably constituted by tension springs of the type shown in Figs. 1 through 4 of the drawings, tension springs of a different nature may be used, as best seen in Fig. 5 of the drawings. In that embodiment of the invention, separate pairs of springs 58 and 59 having their inner ends connected to the opposite ends of a pin 62 on the mount 30 are provided at one end of said mount to supplant the springs 50, while separate pairs of tension springs 60 and 61 having their inner ends engaging the opposite ends of a pin 63 on the opposite end of the mount 30 are adapted to supplant the springs 52. Thus, four tension springs are provided at each end of the mount 30 instead of the two shown in Figs. 1 through 4 of the drawings. In addition, although the clutch has been described as including two clutch shoes 38 and 44, it is conceivable that a clutch embodying the principles of my invention and including only one shoe would be equally effective for some uses.

A linkage 65 connects that end of the shoe 38 opposite the pivotally mounted end to the mount 30. The linkage 65 is a toggle linkage and is constituted by a first toggle link 66 and second toggle links 67, as best shown in Figs. 2 through 4 of the drawings. The upper end of the toggle link 66 includes a shaft 68 which is pivotally mounted and reciprocable in a longitudinal bore 69 in a pivot pin 70, said pivot pin being mounted for rotation in a spacer block 71 between the mounting plates 27 and 28. A nut 72 is threaded upon the end of the shaft 68 to adjust the length of stroke permitted to the shaft within the bore 69 in the pivot pin 70. A compression spring 73 is disposed about the end of the shaft 68 and has one end seated on the spacer block 71 while its other end is seated on an annular flange 74 formed on the toggle link 66. A pivot pin 75 connects the toggle link 66 to and between the toggle links 67, the links 67 being pivotally connected, in turn, to the mounting rib 40 of the shoe 38 by means of a pivot pin 76. It should be understood, that while the link 66 of the toggle linkage 65 is a single element, two toggle links 67 disposed on opposite sides of the mounting rib 40 of the shoe 38 are provided, as best shown in Fig. 1 of the drawings. The toggle links 67 have elongated base portions 77 formed integrally therewith, said base portions having arcuate contacting surfaces 78, as best shown in Figs. 2 through 4 of the drawings, and having attached thereto or integrally formed therewith, centrifugally actuable weights 79.

That end of the clutch shoe 44 opposite its pivotal connection to the mount 30 is connected to the mount by means of a toggle linkage 85 which, as best shown in Figs. 3 and 4 of the drawings, includes a toggle link 86 and toggle links 87. The toggle link 86 includes a shaft 88 which is pivotally and reciprocably mounted in a bore 89 of a pivot pin 90, said pin being, in turn, pivotally mounted in a spacer block 91 between the mounting plates 27 and 28. A nut 92 is threaded upon one end of the shaft 88 and is adapted to determine the length of stroke of reciprocation permitted to the shaft 88 within the bore 89 of the pivot pin 90.

A compression spring 93 is disposed about the shaft 88 and has one end in contact with a side of the spacer block 91 while the other end is seated upon an annular flange 94 formed on the other end of the toggle link 86. A pivot pin 95 connects the other end of the toggle link 86 to the toggle links 87 which are, in turn, pivotally connected to the mounting rib 46 of the clutch shoe 44 by means of a pivot pin 96. The toggle links 87 are disposed on opposite sides of the mounting rib 46 of the clutch shoe 44 and have integrally formed therewith elongated base portions 97 which have arcuate contacting surfaces 98 formed thereupon and which have integrally formed therewith or attached thereto centrifugally actuable weights 99. The compression springs 73 and 93 constitute the auxiliary spring means 101 of my invention and are adapted to augment the centrifugal force generated by the rotation of the shoes 38 and 44 upon the mount 30, in a manner to be described in greater detail below. A bearing 105 is disposed between the sleeve 17 and an outer sleeve 106 to which the driven drum 12 is attached by means of a key 107.

The operation of the clutch is as follows: When the drive shaft 11 is initially rotated, the primary spring means 56, constituted by the tension springs 50 and 52, resists the outward movement of the clutch shoes 38 and 44 toward the brake lining 13 on the interior of the driven drum 12. As the speed of rotation of the drive shaft 11 increases and reaches a speed of 1000 R. P. M., for example, the resistance of the primary spring means 56 is overcome and the shoes 38 and 44 are urged into engagement with the brake lining 13 on the interior of the driven drum 12. The shoes are shown in the above-described position in Fig. 3 of the drawings.

When the drive shaft 11 is inactive, as best shown in Fig. 2 of the drawings, the primary spring means automatically retracts the shoes 38 and 44 from contact with the brake lining 13 on the interior of the drum 12 and also serves to break the toggle linkages 65 and 85 around the pivot pins 75 and 95.

When the shoes 38 and 44 are urged outwardly into engagement with the interior of the driven drum 12, as best shown in Fig. 3 of the drawings, the toggle linkages 65 and 85 are straightened somewhat from their original positions, as shown in Fig. 2 of the drawings, and the weights 79 and 99 are carried outwardly with the base portions 77 and 97 of the toggle links 67 and 87. However, at this time the centrifugal force augmenting effect of the compression springs 73 and 93 constituting the auxiliary spring means 101 has not been brought to bear upon the shoes 38 and 44.

As the speed of rotation of the drive shaft increases and rises to a speed of 1600 R. P. M., for example, the centrifugal force exerted upon the weights 79 and 99 is sufficient to urge them outwardly into the positions shown in Fig. 4 of the drawings. At this point, portions of the arcuate contacting surfaces 78 and 98 of the elongated base portions 77 and 97 of the links 67 and 87 contact the shoes 38 and 44. The toggle links 65 and 85 are brought to within 2° to 5° of their over-center points and the longitudinal axes of the links 66 and 67 and 86 and 87 are substantially coincident so that the compressive force of the springs 73 and 93 may be exerted through the linkages 65 and 85 upon the shoes 38 and 44.

It will be noted that, when the toggle linkages 65 and 85 are broken, as best shown in Figs. 2 and 3 of the drawings, the nuts 72 and 92 are seated on the spacer blocks 71 and 91, indicating that the shafts 68 and 88 have been longitudinally moved their maximum strokes within the bores 69 and 89. However, when the toggle linkages 65 and 85 are substantially straight, that is, within 2° to 5° of their over-center points, the shafts 68 and 88 are longitudinally shifted within the bores 69 and 89. Thus, the spaces between the blocks 71 and 91 and the flanges 74 and 94 are reduced and the increased compressive action of the springs is transmitted through the substantially straight toggle linkages 65 and 85 into the shoes 38 and 44 through the medium of the elongated base portions 77 and 97 of the toggle links 67 and 87. Of importance is the fact that the toggle linkages 65 and 85 can never be urged over-center to permanently lock the shoes 38 and 44 in engagement with the driven drum 12, since they are prevented from moving over-center by the previous engagement of the elongated base portions 77 and 97 of the links 67 and 87 with the shoes 38 and 44, respectively.

As the speed of rotation of the drive shaft 11 is reduced, the linkages 65 and 85 do not immediately break but remain in their substantially straight condition until the speed of rotation of the drive shaft 11 falls below the point where the clutch shoes 38 and 44 initially engage the driven drum 12, for example, 800 R. P. M. This is an extremely important aspect of the invention since it means that the clutch shoes 38 and 44 are held in engagement with the driven drum 12 during the slowing down of the drive shaft and the customary slippage and loss of power encountered with conventional centrifugal actuated clutches is thus eliminated. When the speed of rotation of the drive shaft 11 is reduced to the aforementioned speed, the tension of the primary spring means 56 is sufficient to withdraw the shoes 38 and 44 from engagement with the interior of the driven drum 12, breaking the toggle linkages 65 and 85 and permitting the shoes, linkages, and weights to assume their original positions shown in Fig. 2 of the drawings.

I thus provide by my invention a centrifugal clutch which includes primary spring means adapted to resist the initial engagement of the shoes of the clutch with the driven drum with which it is associated, but which can be overcome by centrifugal force to permit the shoes to go into engagement with said drum. Also provided by my invention is auxiliary spring means adapted to augment the centrifugal force urging the shoes into engagement with the driven drum and actuable at a point subsequent to the initial engagement of the shoes with the drum. The auxiliary spring means is associated with toggle linkages connecting the shoes to a mount secured to the drive shaft, said toggle linkages being weight actuable to bring the auxiliary spring means into play.

I claim as my invention:

In a centrifugal clutch which provides a detachable connection between a drive shaft and a driven drum which is coaxial with and outside of said shaft, the combination with such a shaft and drum of: a mount secured to said shaft and rotatable therewith; a pair of first pivot pins carried by said mount, said pins being equidistant from the axis of said shaft and on a diameter passing through said axis; a pair of clutch shoes disposed inside said drum and so shaped as to engage the inner surface of said drum, one end of each of said clutch shoes being pivoted on and free to move in a limited arc about one of said first pivot pins; a pair of tension springs, one end of each of said springs being connected under initial tension to one of said clutch shoes near the free end thereof and also to the other of said shoes near the pivoted end thereof; a pair of second pivot pins, each engaging said mount and free to turn in said mount, the axes of said second pivot pins being equidistant from the axis of said shaft and on a diameter passing through said axis; a pair of toggle links, each having a cylindrical stem sliding axially through one of said second pivot pins, the outer end of each of said toggle links being forced away from its second pivot pin by a compression spring which is under initial tension; a pair of third pivot pins, each of said pins being carried on the outer end of one of said toggle links; a pair of fourth pivot pins, each of said pivot pins being carried on one of said clutch shoes near the free end of said shoe; and a pair of weights each consisting of a body extending circumferentially between one of said shoes and said shaft and a toggle arm, each of said weights being carried on and free to rotate through a limited arc about one of said fourth pivot pins, the outer end of said arm engaging one of said third pivot pins, said arm being so placed that the axis of said third pivot pin approaches but does not reach a straight line connecting the axis of the second pivot pin with the axis of the fourth pivot pin, when the body of the weight reaches its position furthest from the axis of the shaft as the body swings through its arc.

LEWIS D. THOSTENSON.

REFERENCES CITED

The following references are of record in the file of this patent:

UNITED STATES PATENTS

| Number | Name | Date |
|---|---|---|
| 1,162,309 | Renault | Nov. 30, 1915 |
| 1,917,501 | Cotterman | July 11, 1933 |
| 1,969,683 | Berry | Aug. 7, 1934 |
| 2,042,454 | Banker | June 2, 1936 |
| 2,168,856 | Banker | Aug. 8, 1939 |
| 2,318,433 | Stechbart | May 4, 1943 |
| 2,392,950 | Russell | Jan. 15, 1946 |
| 2,534,426 | Eason | Dec. 19, 1950 |